United States Patent
Aoba et al.

(10) Patent No.: US 9,665,803 B2
(45) Date of Patent: May 30, 2017

(54) IMAGE PROCESSING APPARATUS AND IMAGE PROCESSING METHOD

(71) Applicant: CANON KABUSHIKI KAISHA, Tokyo (JP)

(72) Inventors: Masato Aoba, Tokyo (JP); Takayuki Saruta, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 14 days.

(21) Appl. No.: 14/152,121

(22) Filed: Jan. 10, 2014

(65) Prior Publication Data

US 2014/0198951 A1 Jul. 17, 2014

(30) Foreign Application Priority Data

Jan. 17, 2013 (JP) .................................. 2013-006752

(51) Int. Cl.
*G06K 9/00* (2006.01)
*G06K 9/68* (2006.01)

(52) U.S. Cl.
CPC ....... *G06K 9/6807* (2013.01); *G06K 9/00664* (2013.01)

(58) Field of Classification Search
None
See application file for complete search history.

(56) References Cited

U.S. PATENT DOCUMENTS

| | | | | |
|---|---|---|---|---|
| 6,333,992 B1 * | 12/2001 | Yamamura | ............. | G01N 21/88 348/126 |
| 6,360,003 B1 * | 3/2002 | Doi | ...... | H04N 5/2353 348/E5.037 |
| 6,614,925 B2 * | 9/2003 | DeYong | ................ | G06K 9/00 382/147 |
| 6,687,397 B2 * | 2/2004 | DeYong | ................ | G06K 9/00 348/126 |
| 6,687,404 B1 * | 2/2004 | Hull | ................. | G06K 9/00442 382/180 |
| 6,885,777 B2 * | 4/2005 | Inagaki | ............... | G06K 9/6203 382/287 |

(Continued)

FOREIGN PATENT DOCUMENTS

| | | |
|---|---|---|
| JP | 2002-140693 A | 5/2002 |
| JP | 2009-531784 A | 9/2009 |
| WO | 2007-126947 A2 | 11/2007 |

*Primary Examiner* — Iman K Kholdebarin
(74) *Attorney, Agent, or Firm* — Rossi, Kimms & McDowell LLP

(57) ABSTRACT

A dictionary for detection of an object is created from an image obtained by performing an image process, which depends on a first image process parameter, on the training image of the detection target object. The dictionary created based on the image process depending on the first image process parameter is determined, based on a result of detecting the object from an image obtained by performing an image process, which depends on the first image process parameter, on a photographed image based on the dictionary. A second image process parameter is determined, based on a result of detecting the object from an image obtained by performing an image process, which depends on the second image process parameter, on the photographed image using the determined dictionary.

18 Claims, 12 Drawing Sheets

(56) References Cited

U.S. PATENT DOCUMENTS

| | | | | |
|---|---|---|---|---|
| 6,999,614 B1* | 2/2006 | Bakker | G06T 7/0004 | 382/145 |
| 7,941,009 B2* | 5/2011 | Li | G06F 17/3025 | 382/305 |
| 7,995,805 B2* | 8/2011 | Suzuki | G06K 9/00228 | 382/118 |
| 8,027,521 B1* | 9/2011 | Moon | G06K 9/00288 | 382/118 |
| 8,606,010 B2* | 12/2013 | Xiao | G06K 9/6257 | 382/103 |
| 8,774,504 B1* | 7/2014 | Sundareswara | G06K 9/00201 | 382/165 |
| 8,811,726 B2* | 8/2014 | Belhumeur | G06K 9/00281 | 382/103 |
| 8,873,800 B2* | 10/2014 | Zhou | G06K 9/00375 | 348/143 |
| 2006/0098843 A1* | 5/2006 | Chew | B61K 9/08 | 382/103 |
| 2006/0115145 A1* | 6/2006 | Bishop | G06K 9/6296 | 382/155 |
| 2006/0204103 A1* | 9/2006 | Mita | G06K 9/00248 | 382/190 |
| 2006/0204121 A1* | 9/2006 | Bryll | G06K 9/6288 | 382/255 |
| 2006/0251292 A1* | 11/2006 | Gokturk | G06F 17/30253 | 382/103 |
| 2007/0058837 A1* | 3/2007 | Boregowda | G06T 7/223 | 382/103 |
| 2007/0098254 A1* | 5/2007 | Yang | G06K 9/00369 | 382/159 |
| 2007/0237387 A1* | 10/2007 | Avidan | G06K 9/00369 | 382/159 |
| 2010/0128927 A1* | 5/2010 | Ikenoue | G06T 7/174 | 382/103 |
| 2011/0182495 A1* | 7/2011 | Sun | G06T 7/0004 | 382/141 |
| 2012/0020550 A1* | 1/2012 | Zhou | G06K 9/00375 | 382/155 |
| 2012/0183213 A1* | 7/2012 | Robles-Kelly | G06K 9/00362 | 382/165 |
| 2012/0269392 A1* | 10/2012 | Saruta | G06K 9/4604 | 382/103 |
| 2013/0202199 A1* | 8/2013 | Geisler | G06T 3/4007 | 382/159 |
| 2014/0003734 A1* | 1/2014 | Umansky | G06T 5/003 | 382/275 |
| 2014/0341462 A1* | 11/2014 | Sezginer | G06T 7/0008 | 382/149 |
| 2015/0006443 A1* | 1/2015 | Rose | G06N 99/005 | 706/12 |

\* cited by examiner

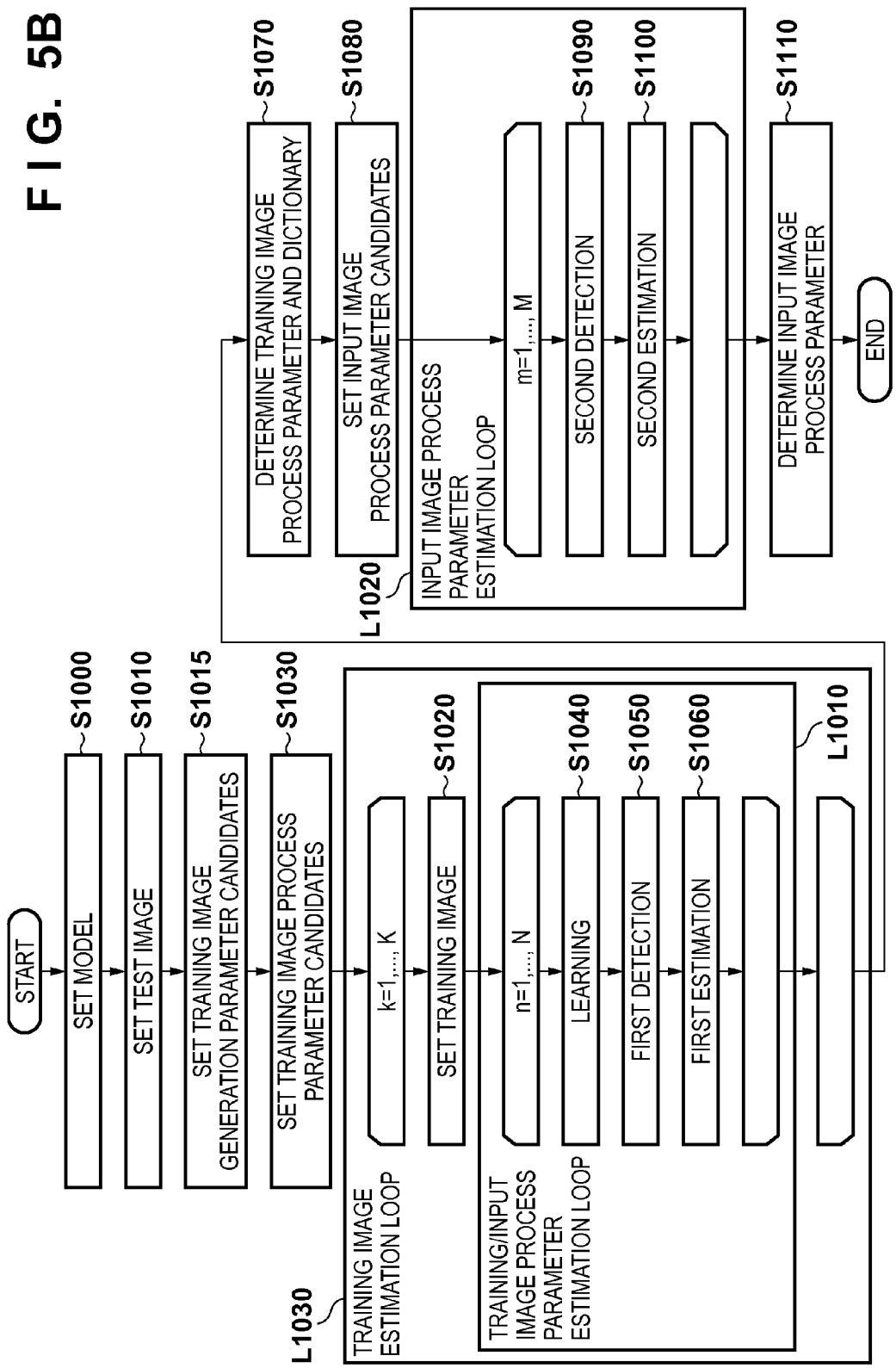

F I G. 10A
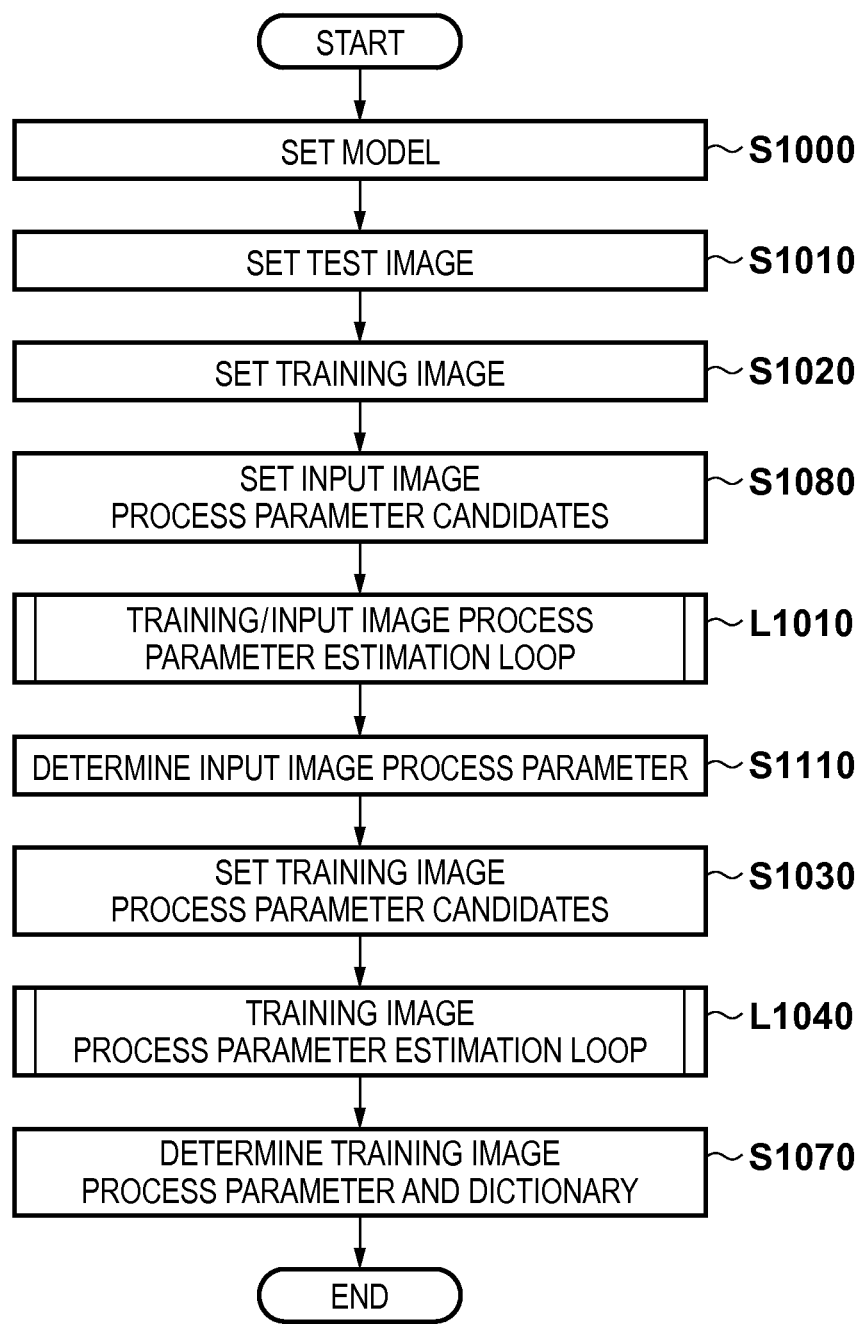

F I G. 10B
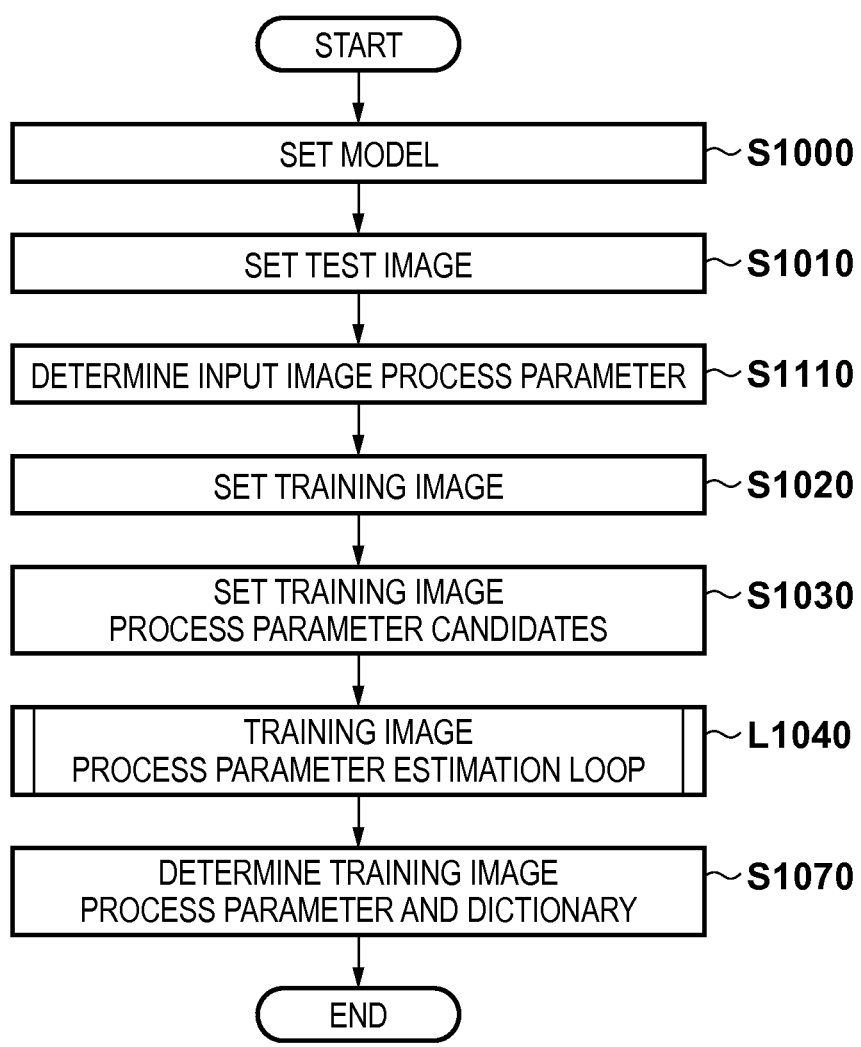

IMAGE PROCESSING APPARATUS AND IMAGE PROCESSING METHOD

BACKGROUND OF THE INVENTION

Field of the Invention

The present invention relates to an image process of setting image process parameters to be used in an image recognition process of detecting an object from an input image.

Description of the Related Art

Various kinds of research and development have been carried out concerning image recognition of detecting a detection target object from an image obtained by capturing an object. The image recognition technology is applied to various fields and used for many actual problems of, for example, face recognition in a photograph and part recognition in a factory.

Such image recognition can be considered from the viewpoint of pattern recognition. In the pattern recognition as well, research has been conducted on classifiers, that is, how to classify input information. There have been proposed various methods such as a neural network, Support Vector Machine (SVM), and Randomized Trees (RT).

The performance of these classifiers greatly depends on the method of extracting information from an image, and the extraction method includes various kinds of image processes. There are, for example, noise removal of removing unnecessary information from an image, gamma correction of adjusting the luminance value, and edge detection of obtaining edge information as an image feature. In addition, various image feature extraction methods are known, including extracting a feature in a predetermined region of an image as a vector. Examples are Histograms Of Oriented Gradients (HOG) and Scale-Invariant Feature Transform (SIFT).

In these image processes executed when extracting information from an image, various parameters exist depending on the method. For example, there exist parameters such as a variance in a Gaussian filter used in noise elimination, and a cell size and a cell count in HOG. The set values of these parameters largely affect information obtained from an image.

In the above-described classifiers, the optimum values of the image process parameters used to obtain optimum performance change depending on the target object, environmental conditions, and the like. In many case, the parameters are set by the user's experience or trial and error. For this reason, setting the image process parameters in image recognition puts a heavy load on the user. To prevent this, methods of easily setting the parameters have been proposed.

For example, there has been proposed a first method of automatically determining optimum parameters in machine vision tools. According to the first method, an image used for parameter adjustment is captured first. Marking of an object is performed using a bounding box or the like, thereby giving ground truth (accuracy information) for the object. The machine vision tools are sequentially executed while changing the parameter combination. The detection result obtained by the current parameter combination is compared with the ground truth. The comparison result is compared with that in the preceding parameter combination. The parameter combination that yields the better comparison result is left, and finally, best parameters are left.

There has also been proposed a second method of optimizing image process parameters used to convert a photographed image when detecting a target object. According to the second method, if a result of a detection process for an image obtained by performing an image process of a photographed image in accordance with image process parameters indicates a detection error, the image process parameters are changed, thereby determining the image process parameters.

In the first method, however, the operation of giving ground truth is complicated for the user. In addition, ground truth subjectively set by the user is not necessarily accurate. If the ground truth given by the user includes a large error, the result of comparison between the detection result and the ground truth cannot have an accurate value, and the reliability of the determined parameters is low.

In an image recognition system that generates a classifier by learning using a training image, an image process of the training image is also necessary. If the training image and input image from which an object should be detected are images obtained under different conditions (for example, if the training image is a computer graphics (CG) image, whereas the input image is a photographed image), the optimum image process parameter for the training image and that for the input image are not always the same. In this case, applying, to the training image, an image process parameter obtained by applying the second method to the photographed image is not appropriate.

SUMMARY OF THE INVENTION

In one aspect, an image processing apparatus for setting image process parameters to be used in an image recognition process of detecting an object from an input image, comprising: a learning unit configured to create a dictionary for detection of the object from an image obtained by performing an image process, which depends on a first image process parameter, on a training image of a detection target object; a detection unit configured to detect the object based on the dictionary from a photographed image including the image of the object; a first determination unit configured to determine the dictionary created based on the image process depending on the first image process parameter, based on a detection result that the detection unit detects the object from an image obtained by performing an image process, which depends on the first image process parameter, on the photographed image; and a second determination unit configured to determine a second image process parameter, based on a detection result that the detection unit using the determined dictionary detects the object from an image obtained by performing an image process, which depends on the second image process parameter, on the photographed image.

According to the aspect, it is possible to set optimum values in an image process parameter for a training image and that for an input image, which are used in an image recognition process of detecting an object from an input image, thus a dictionary and an image process parameter for the input image which are optimum for the image recognition process will be obtained.

Further features of the present invention will become apparent from the following description of exemplary embodiments with reference to the attached drawings.

BRIEF DESCRIPTION OF THE DRAWINGS

FIGS. 5A to 5C are flowcharts showing a parameter setting process.

FIGS. 10A to 10C are flowcharts showing modifications of a parameter setting process.

DESCRIPTION OF THE EMBODIMENTS

Hereinafter, embodiments of the present invention will be described with reference to the accompanying drawings. It should be noted that the following embodiments are not intended to limit the scope of the appended claims, and that not all the combinations of features described in the embodiments are necessarily essential to the solving means of the present invention.

First Embodiment

An embodiment will be described below in which an image process parameter of a training image (to be referred to as a "training image process parameter" hereinafter) representing an object and an image process parameter of an input image (to be referred to as an "input image process parameter" hereinafter) are set in an image recognition process of detecting the object from the input image. The training image process parameter and the input image process parameter will sometimes be referred to as image process parameters altogether. An object whose, for example, position and orientation are to be detected from an input image will be referred to as a "target object".

[Setting of Image Process Parameters]

Figure 1:
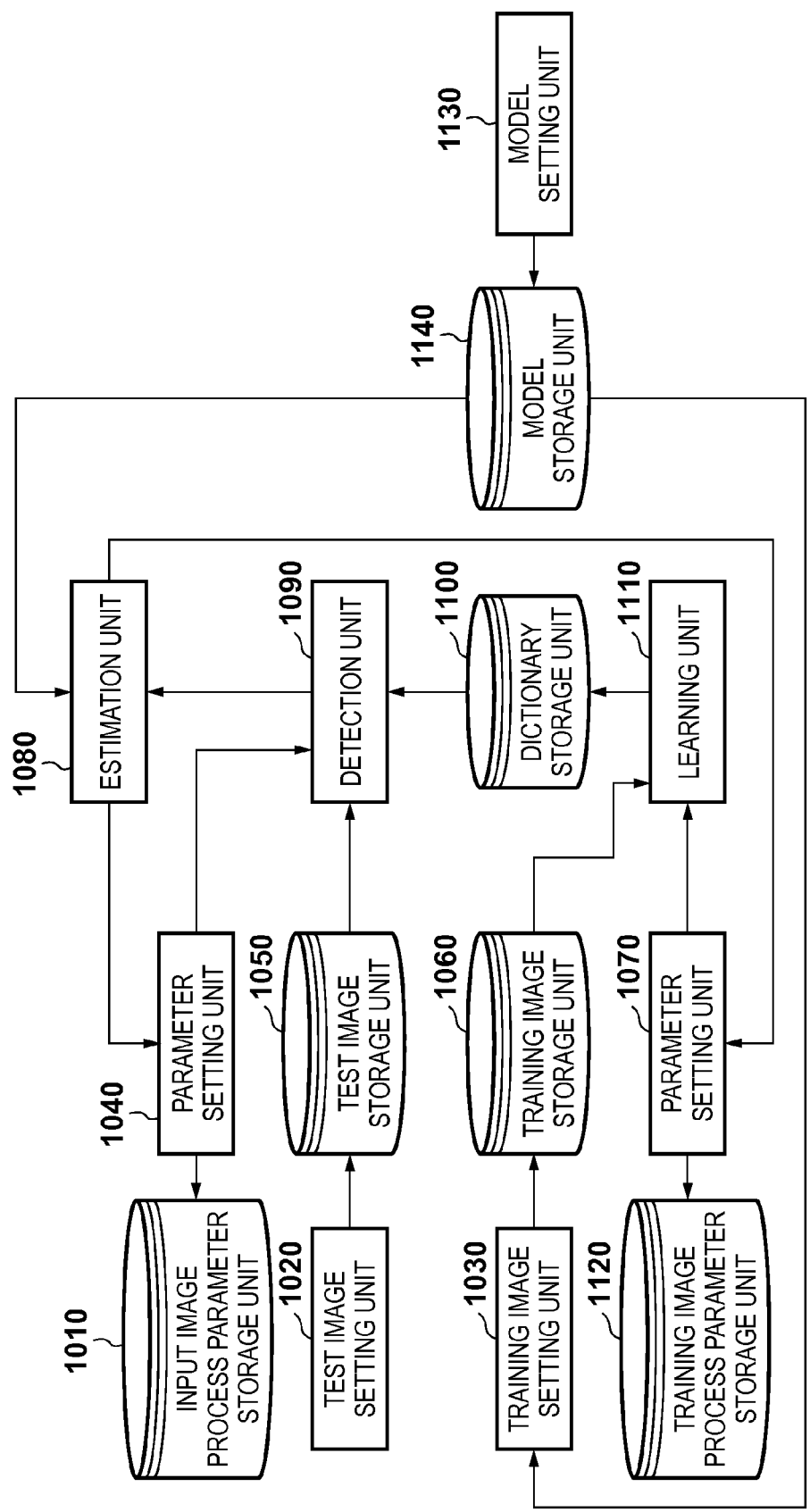
FIG. 1 is a block diagram showing an arrangement for setting image process parameters in an image processing apparatus that performs an image recognition process according to an embodiment.

FIG. 1 shows the outline of an arrangement for setting image process parameters in an image processing apparatus that performs an image recognition process according to this embodiment. A model setting unit 1130 sets the model of a target object and stores it in a model storage unit 1140. A training image setting unit 1030 sets a training image used to generate a dictionary for target object detection based on the model stored in the model storage unit 1140. The set training image is stored in a training image storage unit 1060.

A parameter setting unit 1070 sets a training image process parameter for an image process to be performed for the training image, and stores the training image process parameter in a training image process parameter storage unit 1120. A learning unit 1110 performs an image process according to the training image process parameter for the training image stored in the training image storage unit 1060, and performs learning using the training image that has undergone the image process, thereby generating a dictionary. The generated dictionary is stored in a dictionary storage unit 1100.

A test image setting unit 1020 sets a test image including the image of the target object. The set test image is stored in a test image storage unit 1050. A parameter setting unit 1040 sets an input image process parameter for an image process to be performed for an input image, and stores the input image process parameter in an input image process parameter storage unit 1010.

A detection unit 1090 performs an image process according to the input image process parameter for the test image stored in the test image storage unit 1050. The detection unit 1090 then detects the target object from the test image that has undergone the image process, based on the dictionary stored in the dictionary storage unit 1100, and outputs the detection result to an estimation unit 1080. In other words, the detection unit 1090 performs the image process based on the input image process parameter and a target object detection process based on the dictionary using the test image as an input image.

The estimation unit 1080 estimates the input detection result and outputs the estimation result to the parameter setting units 1040 and 1070. The parameter setting units 1040 and 1070 determine optimum input image process parameter and training image process parameter, respectively, based on the estimation result of the estimation unit 1080.

Note that the input image process parameter is an image process parameter used when performing an image process for the input image. The training image process parameter is an image process parameter used when performing an image process for the training image for dictionary creation. Even when indicating the same item such as the variance in a Gaussian filter, the input image process parameter and the training image process parameter do not necessarily have the same value.

The outline of an arrangement for detecting a target object using the image process parameters determined by the above-described arrangement and the generated dictionary will be described next with reference to FIG. 2.

Figure 2:
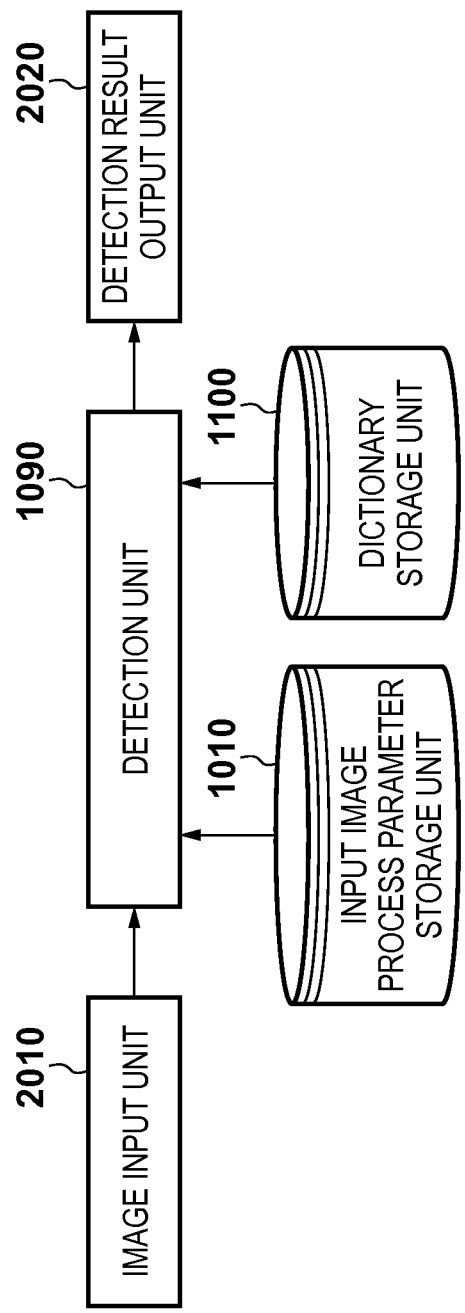
FIG. 2 is a block diagram showing an arrangement for detecting a target object using an input image process parameter and a dictionary.

Referring to FIG. 2, the detection unit 1090 loads the input image process parameter and dictionary determined by the arrangement shown in FIG. 1 from the input image process parameter storage unit 1010 and the dictionary storage unit 1100. An image input unit 2010 inputs an image and outputs the input image to the detection unit 1090. Upon receiving the input image, the detection unit 1090 performs an image process for the input image using the input image process parameter loaded in advance, and also performs a target object detection process in accordance with the dictionary loaded in advance. The detection result (for example, the position and orientation of the target object) obtained by the detection unit 1090 is output from a detection result output unit 2020 using a predetermined method and form.

[Application to Robot Operation]

Figure 3:
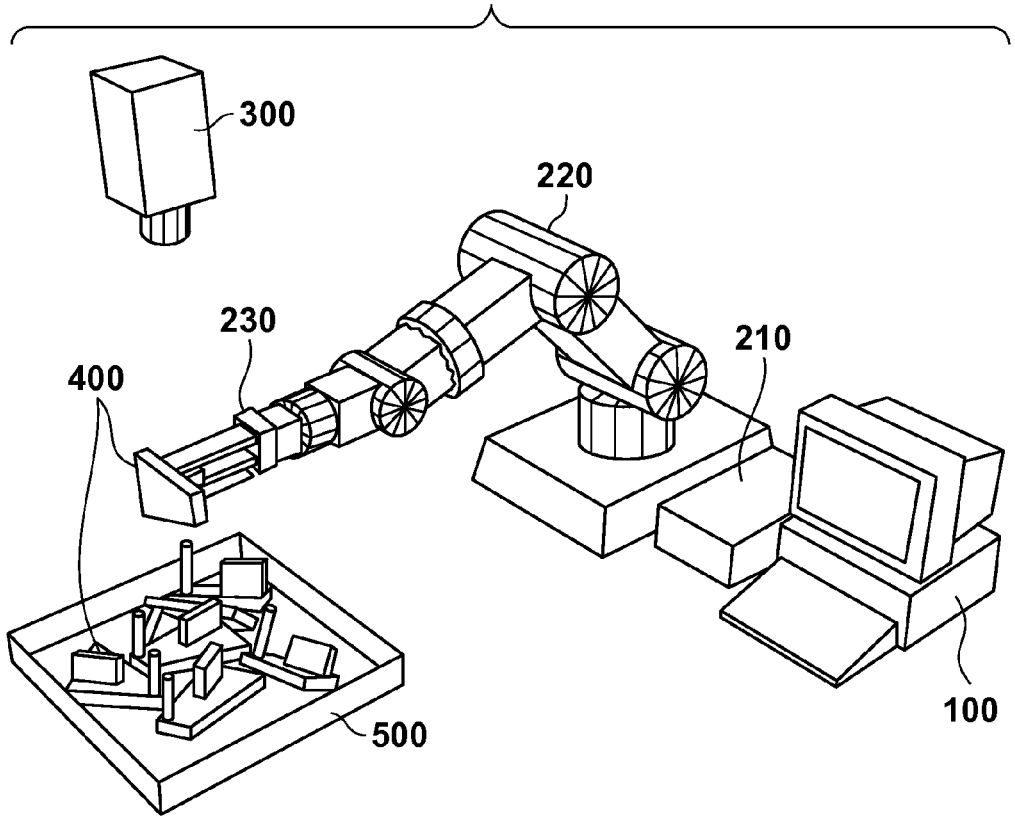
FIG. 3 is a perspective view showing an example in which the image processing apparatus according to the embodiment is applied to a robot that detects a target object.

An example in which the image processing apparatus according to this embodiment including the above-described arrangement is applied to an operation by a robot will be described below. FIG. 3 shows the arrangement of an apparatus for detecting a target object in run time. Referring to FIG. 3, target objects 400 to be detected are placed on a tray 500. A camera 300 corresponds to the image input unit 2010 shown in FIG. 2. The camera 300 can be a single-lens reflex camera configured to obtain image information, a stereo camera or Time-of-Flight (TOF) sensor configured to obtain distance information, or an apparatus of a light-section method or space encoding method by a combination a camera and a floodlight lamp. The camera 300 is connected to a computer 100 wirelessly or via a wire.

The computer 100 incorporates arrangements corresponding to the detection unit 1090 and the detection result output unit 2020 shown in FIGS. 1 and 2 as programs or circuits. A storage device such as a hard disk provided inside or outside the computer 100 corresponds to the above-described input image process parameter storage unit 1010 and dictionary storage unit 1100. Note that the detection unit 1090, the detection result output unit 2020, the dictionary storage unit 1100, and the input image process parameter storage unit 1010 are not limited to the arrangements as described above. For example, an arrangement formed by combining a computer and a server apparatus via a network, or an internal circuit of a camera and a memory (to a detachable storage medium such as a memory card) may be used.

The computer 100 is electrically connected to a robot controller 210. The robot controller 210 is electrically connected to a robot arm 220. The robot arm 220 operates by receiving an instruction signal from the robot controller 210. The robot arm 220 is provided with an end effector 230 configured to perform a predetermined operation such as a gripping operation for an operation target object.

[Run-Time Process]

A run-time process in the arrangement shown in FIG. 3 will be described with reference to the flowchart of FIG. 4. "Run time" indicates performing an object detection process for an input image using the input image process parameter determined by the embodiment and the dictionary obtained by a learning process. The arrangement shown in FIG. 3 is configured to capture objects conveyed one after another and perform an object detection process in, for example, a factory. However, the present invention is not limited to the above-described run-time process. For example, when the present invention is applied to face recognition, even a scene in which a person is captured by a camera, and face recognition is performed can also be regarded as a run-time process.

Figure 4:
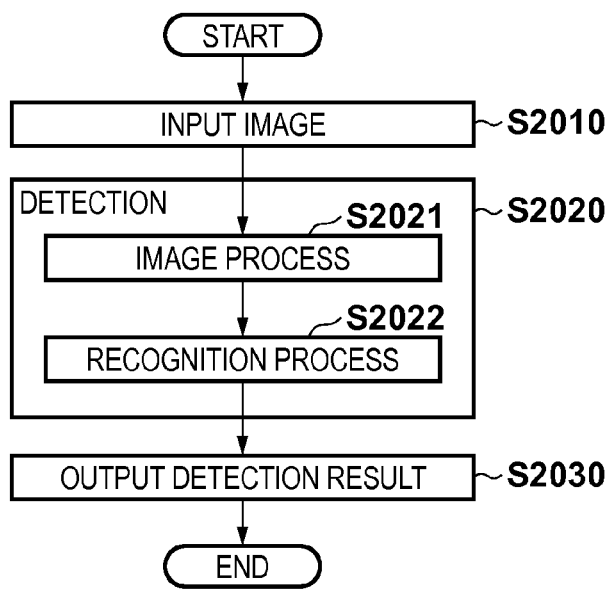
FIG. 4 is a flowchart showing a run-time process.

Referring to FIG. 4, in image input step S2010, the target object 400 placed on the tray 500 is captured by the camera 300. The obtained image is input to the computer 100. In detection step S2020, the detection unit 1090 estimates the position and orientation of the target object 400 from the input image.

In detection step S2020, first, an image process based on the input image process parameter is performed as image process step S2021. In this case, an image process is a general term for processes of converting the input image into a format easy to handle for the detection unit 1090, and the contents of the process are not limited. The image process includes, for example, noise removal using a Gaussian filter, a median filter, or the like, and edge extraction using a Sobel filter, a LoG filter, a Laplacian filter, a Canny edge detector, or the like. An image process described here also includes a preprocess such as enlargement/reduction and gamma correction and a feature extraction process such as HOG and SIFT. A feature extraction process such as Spin Image using not a two-dimensional image but a three-dimensional image may also be included. In addition, not only one of these processes is always selectively performed as the image process, and a combined process of, for example, performing edge extraction using a Sobel filter after noise removal using a Gaussian filter may also be included.

There may exist a parameter that controls the response when performing these image processes in image process step S2021. For example, when a Gaussian filter is used, the blur range changes depending on the magnitude of the variance. Even when the same image is used, different HOG feature amounts are obtained by changing the cell size or cell count of HOG. The control parameters for such image processes will be generically referred to as "input image process parameters".

When image process step S2021 ends, an image recognition process using the dictionary is performed for the input image that has undergone the image process based on the input image process parameter, and a detection result is obtained in image recognition step S2022. The detection result includes the estimated position and orientation of the target object 400. The image recognition process performed here is a process of classifying the position and orientation of the target object 400 using a classifier. The dictionary used at this time defines the classifier. The classifier defined by the dictionary judges to which class the target object 400 included at part of the image belongs, thereby recognizing the position and orientation. Note that the method used as the classifier is not particularly limited, and any existing method is applicable. For example, a classifier by SVM or RT may be used. The obtained detection result is output to the detection result output unit 2020.

In detection result output step S2030, the detection result output unit 2020 encodes an instruction to cause the robot to perform a predetermined operation from the estimated position and orientation of the target object 400 included in the detection result, and outputs the instruction to the robot controller 210. The robot controller 210 decodes the input instruction, and operates the robot arm 220 and the end effector 230 in accordance with the instruction to perform a predetermined operation for the recognized operation target object (target object 400).

[Parameter Setting Process]

When performing the above-described run-time process, a dictionary and an input image process parameter suitable for the target object 400 and the operation environment are necessary. A process of setting such a dictionary and input image process parameter will be described below. Note that as described above, the dictionary according to this embodiment is created based on a training image, and an image process based on a training image process parameter is performed for the training image. Hence, when setting an optimum dictionary, an image process with which the dictionary should be generated is performed for the training image, and a training image process parameter for implementing the image process is set.

The setting process of the dictionary and the input image process parameter according to this embodiment is performed by the arrangement shown in FIG. 1. Note that the training image setting unit 1030, the parameter setting unit 1040, the parameter setting unit 1070, the estimation unit 1080, the detection unit 1090, and the learning unit 1110 shown in FIG. 1 are implemented in the computer 100 shown in FIG. 3 as programs. Additionally, the input image process parameter storage unit 1010, the training image process parameter storage unit 1120, the test image storage unit 1050, the training image storage unit 1060, and the dictionary storage unit 1100 are allocated in, for example, the hard disk of the computer 100. Note that the hard disk is connected to the inside or outside of the computer 100. However, the embodiment of the present invention is not limited to this example, and the setting process of the dictionary and the input image process parameter may be executed using a computer and a hard disk which are different from those used in run time or a computer and a memory incorporated in a camera. The test image setting unit 1020 is implemented in the camera 300 or the computer 100 shown in FIG. 3 as a program for controlling the camera 300.

Figure 5A:
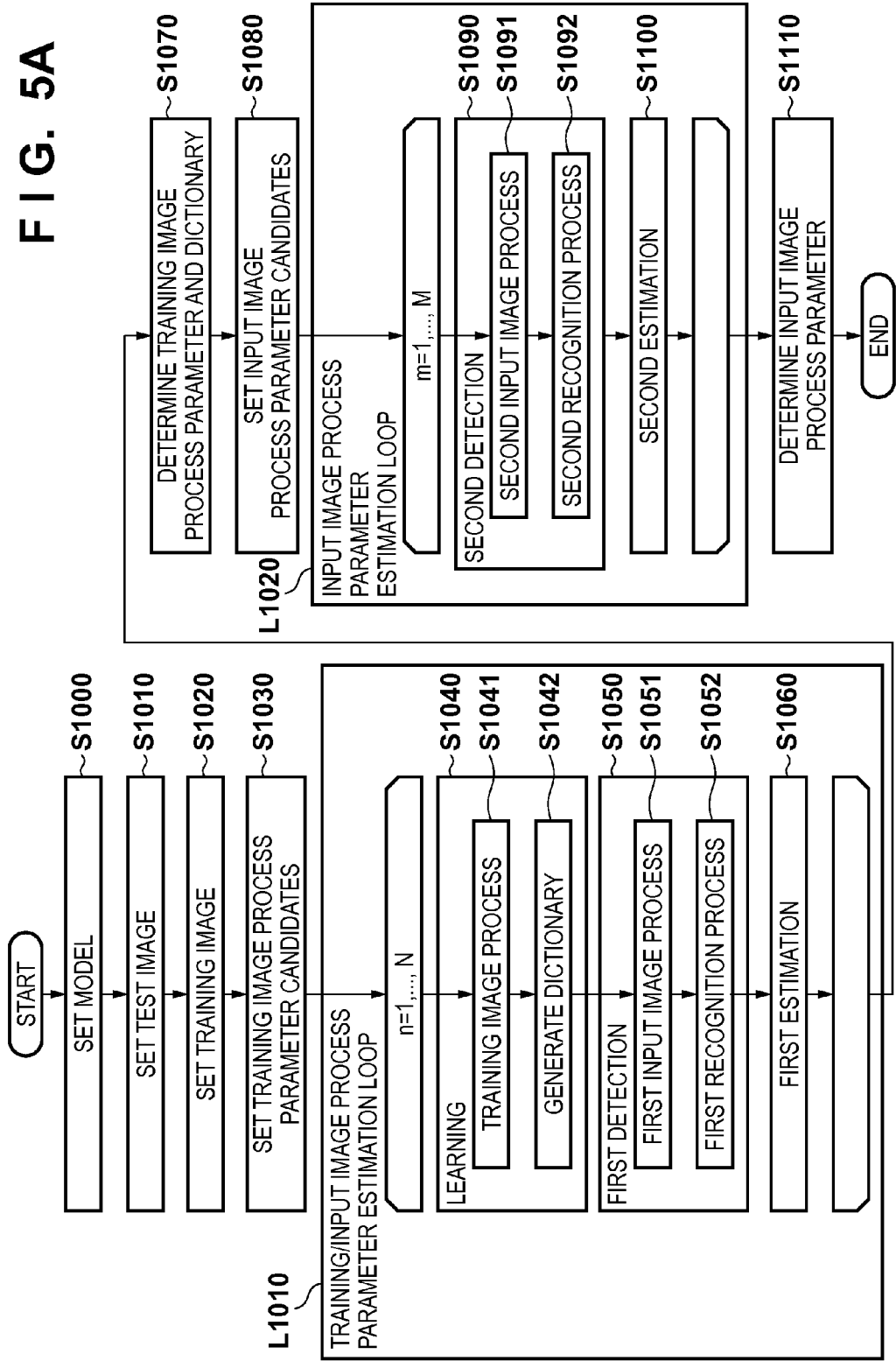

The setting process of the dictionary and the input image process parameter according to this embodiment will be described below with reference to the flowchart of FIG. 5A.

First, in model setting step S1000, the model of the target object 400 is set. In this case, the model indicates model information including information necessary to generate the CG image of the target object, as will be described later. More specifically, the model indicates CAD (Computer Aided Design) data or polygon model of the target object 400.

In test image setting step S1010, the target object 400 is arranged on the tray 500 and captured by the camera 300, thereby acquiring a photographed image including the image of the target object 400. The acquired photographed image is stored in the test image storage unit 1050 as a test image. The test image is a photographed image (input image at the time of estimation) to be estimated in an estimation step to be described later and is preferably captured under the same environmental conditions as in run time. Although at least one test image suffices, the following explanation will be made assuming that about five test images are captured. When capturing a plurality of test images, the position and orientation of the target object 400 preferably change in every capturing state to obtain many variations of position and orientation.

In training image setting step S1020, a training image necessary to generate a dictionary is set. The training image is generated as a CG image based on the model (for example, CAD data) of the target object 400 set in model setting step S1000. For example, if the optical characteristic of the surface of the target object 400 represented by a bidirectional reflectance distribution function (BRDF) and light source information in the operation environment are known, the appearances of the target object 400 in various orientations can be reproduced by CG images using a known rendering technology.

Figure 6:
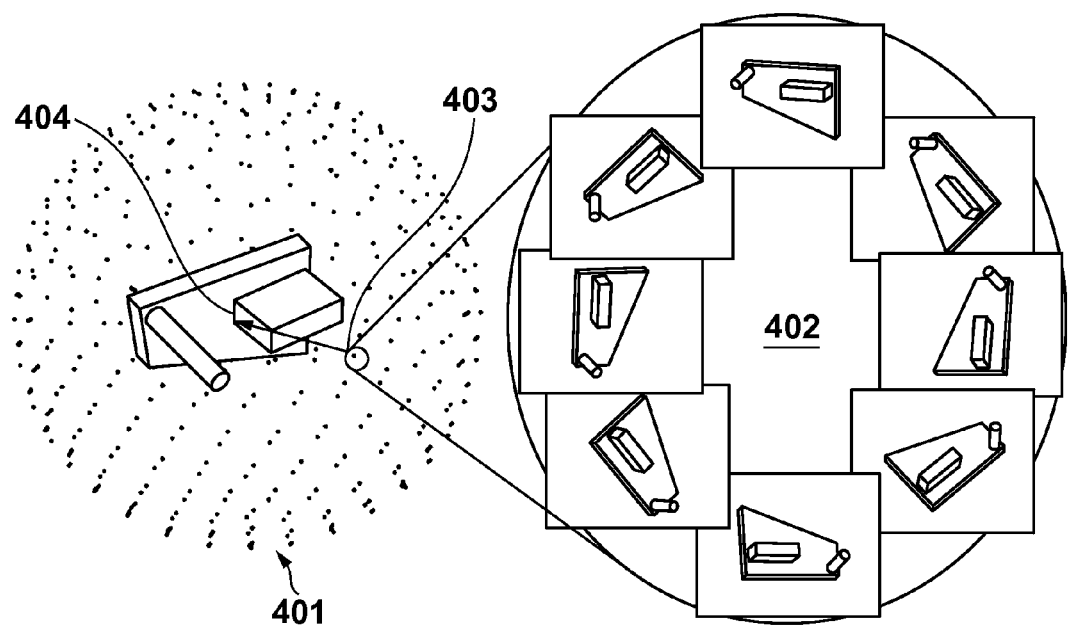
FIG. 6 is a view showing training image generation by CG images.

FIG. 6 showing training image generation by CG images. As shown in FIG. 6, training images are generated as variations based on each viewpoint 403 on the surface of a geodesic dome 401 about an object center 404 of the target object 400 and in-plane rotation 402 of the image at the viewpoint 403. Each training image is given an index of orientation class. For example, when training images are generated as variations based on 72 viewpoints and in-plane rotation by 30°, a classifier of 72×(360/30)=864 classes is learned as the dictionary.

In training image process parameter setting step S1030, N patterns are set as training image process parameter candidates for an image process to be performed for the training images set in training image setting step S1020.

Combinations of a plurality of parameters may be prepared as the training image process parameter candidates within a predetermined parameter range in the image process to be performed for the training images. For example, when performing noise removal by a median filter and edge extraction by a Laplacian filter as an image process, combinations of these parameters may be used as training image process parameter candidates. More specifically, N=3×3=9 parameters obtained by combining median filter sizes=3, 5, 7 and Laplacian filter sizes σ=3, 5, 7 may be prepared as the training image process parameter candidates. If there are many parameter combinations, and the number of training image process parameter candidates is large, candidates selected at random from those training image process parameter candidates may be used. Alternatively, the training image process parameter candidates may be narrowed down based on a statistic obtained by performing an image process using various parameter combinations for the test image acquired in test image setting step S1010.

Next, an image process parameter estimation process is performed using the same image process parameter for the training image and the input image. This process is executed as training/input image process parameter estimation loop L1010. Loop L1010 includes learning step S1040, first detection step S1050, and first estimation step S1060. Steps S1040 to S1060 are repetitively executed as many times as the number N of training image process parameter candidates.

In nth (1≤n≤N) learning step S1040 of repetition, dictionary candidates are generated by an image process using the nth training image process parameter candidate. Learning step S1040 is divided into training image process step S1041 and dictionary generation step S1042. In training image process step S1041, an image process using the nth training image process parameter candidate is performed for all training images. In dictionary generation step S1042, using the training images that have undergone the image process in training image process step S1041, dictionary candidates are generated in accordance with the format of the classifier used by the detection unit 1090. The generated dictionary candidates are stored in the dictionary storage unit 1100.

In first detection step S1050, a detection process of the target object 400 in the test image is performed using the dictionary candidate generated in learning step S1040. First detection step S1050 is divided into first input image process step S1051 and first recognition process step S1052. In steps S1051 and S1052, the same processes as in steps S2021 and S2022 of FIG. 4 are performed, and the estimated values of the position and orientation of the target object 400 in the test image are calculated as the detection result. Note that the value of the input image process parameter used in first input image process step S1051 is the same as that of the nth training image process parameter candidate.

The detection result calculated in first detection step S1050 is estimated in first estimation step S1060. First, based on the estimated position and orientation obtained as the detection result, a CG image of the target object 400 is generated from the model set in model setting step S1000 as the model image of the target object 400.

Although the CG image may directly be generated for the estimated position and orientation obtained as the detection result, it may be generated for a result obtained by more specifically performing matching using a known tracking technique. That is, it is possible to generate a CG image using estimated position and orientation after more specifically performing matching for the test image using a known tracking technique while setting the estimated position and orientation of the target object 400 obtained as the detection result as initial values.

The generated CG image and the test image are binarized by an edge extraction process. Point positions on both images are compared to calculate a distance. The sum of distances or the sum of squares of distances is calculated as a detection error (estimation value). That is, in first estimation step S1060, the estimation value of the detection result is calculated based on the difference at corresponding portions between the model image (CG image) generated from the detection result and the model information and the image of the target object 400 in the test image.

Note that when distance information is obtained, the estimation may be done using a distance residual in the following way. As the distance information, a depth map representing the distance information of each pixel position on image coordinates, point cloud data representing a point cloud on a camera coordinate system, or the like is usable. That is, based on the estimated position and orientation obtained as the detection result of first detection step S1050, the distance from the object surface in that position and orientation to a predetermined position (for example, camera position) is calculated from the model. The distance is compared with the distance information corresponding to the test image, and the sum of distance residuals or the sum of squares of the distance residuals is calculated as a detection error (estimation value).

Alternatively, the estimation may be done using information obtained by converting the training image and the test image using the image process parameters. In this case, the generated CG image is converted using the training image process parameter, and the test image is converted using the input image process parameter. Similarities of existence regions of the target object 400 in the CG image are compared using correlation or the like, and the similarity is calculated as the estimation value. The user may visually observe the generated CG image and the test image and estimate the difference. For example, the error of the positional shift or orientation shift is defined in a plurality of levels (for example, five levels of "large", "rather large", "medium", "rather small", and "small"), and the user's subjective estimation value is acquired. The above-described various estimation values may be combined by, for example, linear combination into one estimation value.

When the estimation values of all the training image process parameter candidates of the N patterns are obtained in training/input image process parameter estimation loop L1010, loop L1010 ends. In training image process parameter and dictionary determination step S1070, the training image process parameter is determined. That is, out of the candidates of the N patterns, the candidate of the best estimation value is stored in the training image process parameter storage unit 1120 as the optimum training image process parameter. At the same time, the dictionary candidate obtained simultaneously is stored in the dictionary storage unit 1100 as the optimum dictionary. Note that "good estimation value" changes depending on the definition of the estimation value, and indicates a smaller value when the estimation value is the detection error or a larger value when the estimation value is the similarity.

With the above-described process, the optimum value of the training image process parameter and the optimum dictionary are set. Next, to optimize the input image process parameter, M patterns are set as input image process parameter candidates in input image process parameter candidate setting step S1080. Values close to the optimum training image process parameter obtained in training image process parameter and dictionary determination step S1070 are prepared as the input image process parameter candidates. For example, when a combination of median filter size=5 and Gaussian filter variance σ=2 is obtained as the optimum training image process parameter, for example, median filter sizes=4.5, 5, 5.5 and Gaussian filter variances σ=1.5, 2, 2.5 are set as the input image process parameter candidates.

Next, an input image process parameter candidate estimation process is performed. This process is executed as input image process parameter estimation loop L1020. Loop L1020 includes second detection step S1090 and second estimation step S1100. Steps S1090 to S1100 are repetitively executed as many times as the number M of input image process parameter candidates.

In mth (1≤m≤M) second detection step S1090 of repetition, a detection process of the target object 400 in the test image is performed using the optimum dictionary determined in training image process parameter and dictionary determination step S1070. Second detection step S1090 is divided into second input image process step S1091 and second recognition process step S1092. In steps S1091 and S1092, the same processes as in steps S2021 and S2022 of FIG. 4 are performed, and the estimated values of the position and orientation of the target object 400 in the test image are calculated as the detection result. Note that the input image process parameter used in second input image process step S1091 is the mth input image process parameter candidate.

The detection result calculated in second detection step S1090 is estimated in second estimation step S1100 by the same method as in first estimation step S1060.

When the estimation values of all the input image process parameter candidates of the M patterns are obtained in input image process parameter estimation loop L1020, loop L1020 ends. In input image process parameter determination step S1110, the input image process parameter is determined. That is, as in training image process parameter and dictionary determination step S1070, out of the candidates of the M patterns, the candidate of the best estimation value is stored in the input image process parameter storage unit 1010 as the optimum input image process parameter.

As described above, according to this embodiment, the training image process parameter for the training image used to generate the dictionary and the input image process parameter for the input image in which the target object should be detected are separately optimized in the image recognition process. Hence, even when the creation condition of the training image and that of the input image are different, optimum image process parameters can be obtained. In addition, the ground truth of the target object is unnecessary when detecting the target object from the test image. This obviates the necessity of the operation of preparing and inputting the ground truth by the user.

Second Embodiment

The second embodiment of the present invention will be described next. Note that the arrangement of an image processing apparatus according to the second embodiment is the same as in the first embodiment, and a description thereof will be omitted. In the above-described first embodiment, an example has been described in which when generating a training image by CG from the CAD data of the target object 400 in training image setting step S1020, rendering is performed based on the optical characteristic of the surface of the target object 400 and the light source information of the operation environment. In the second embodiment, an example will be explained in which when the optical characteristic of the surface of a target object 400 is unknown, the luminance distribution of the surface of the target object 400 is modeled, and the luminance distribution parameter is optimized, thereby generating a training image.

The luminance distribution parameter of the surface of the target object 400 will be referred to as a "training image generation parameter" hereinafter. A parameter setting process including the training image generation parameter according to the second embodiment will be described with reference to the flowchart of FIG. 5B. Note that the same step numbers as in the flowchart of FIG. 5A shown in the above-described first embodiment denote the same processes in FIG. 5B, and a description thereof will be omitted.

First, in model setting step S1000, the model of the target object 400 is set, as in the first embodiment. In test image setting step S1010, a test image is acquired by capturing the target object 400. After that, training image generation parameter candidate setting step S1015 is executed. In training image generation parameter candidate setting step S1015, K patterns of candidates of the training image generation parameter used to generate a training image are prepared.

Figure 7:
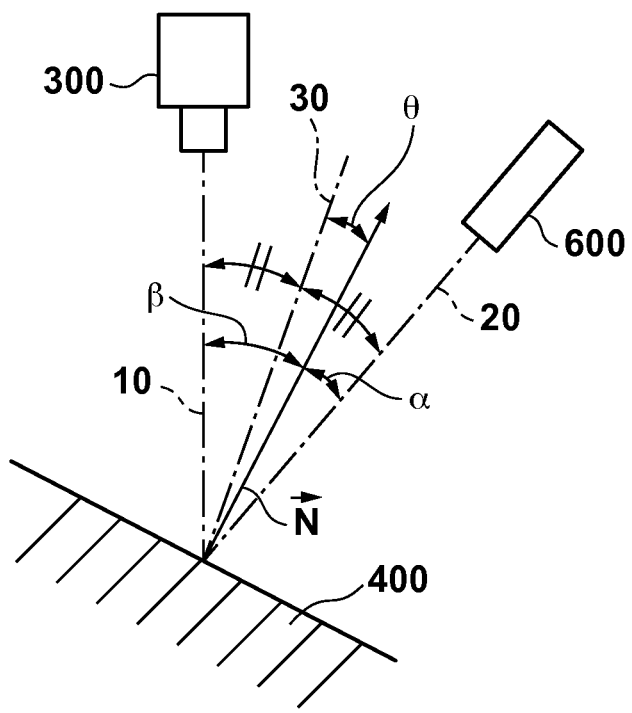
FIG. 7 is a view for explaining acquisition of the optical characteristic of the surface of a target object.

Detailed examples of the training image generation parameter are as follows. For example, assume that the light source is single parallel light, and an object surface as the target object 400 causes Lambert reflection (diffused reflection). In this case, the training image generation parameter can be approximated by a relatively simple luminance distribution model. FIG. 7 shows a state in which a light source 600 irradiates the target object 400 with light, and a camera 300 receives the reflected light. The intermediate direction between a light source direction vector $\vec{L}=(Lx, Ly, Lz)$, on the camera coordinate system, of a light source axis 20 from the surface of the target object 400 to the light source 600 and a camera optical axis direction vector $\vec{V}=(Vx, Vy, Vz)$ of a camera optical axis 10 is defined as a reflection center axis 30. Then, a direction vector $\vec{H}=(Hx, Hy, Hz)$ of the reflection center axis 30 is given by $$\vec{H}=(\vec{L}+\vec{V})/|\vec{L}+\vec{V}| \quad (1)$$

Let θ be the angle made by a normal vector $\vec{N}=(Nx, Ny, Nz)$ at an arbitrary surface position of the target object 400 and the direction vector $\vec{H}$ of the reflection center axis 30. The angle θ is given by $$\theta=\cos^{-1}\{\vec{H}\cdot\vec{N}/(|\vec{H}||\vec{N}|)\} \quad (2)$$

At this time, a luminance value I at the surface position of the target object 400 can be approximated as the function of θ using a Gaussian function as $$I(\theta)=C\cdot\exp(-\theta 2/m) \quad (3)$$

where C and m are parameters representing the intensity of the entire luminance distribution and the spread of the luminance distribution, respectively. The parameters C and m and the direction vector $\vec{H}$ of the reflection center axis 30 are obtained as training image generation parameters.

A Torrance-Sparrow luminance distribution model is known to include mirror reflection components, which is represented by $$I(\theta,\alpha,\beta)=K_d\cdot\cos\alpha+K_s\cdot 1/\cos\beta\cdot\exp(-\theta 2/m') \quad (4)$$

where $K_d$, $K_s$, and m' are parameters in this model. When this model is applied to FIG. 7, θ is the angle θ made by the normal vector $\vec{N}$ and the direction vector $\vec{H}$ of the reflection center axis 30, as in equation (2). In addition, α is the angle made by the normal vector $\vec{N}$ and the light source direction vector $\vec{L}$, and β is the angle made by the normal vector $\vec{N}$ and the camera optical axis direction vector $\vec{V}$, which are given by $$\alpha=\cos^{-1}\{\vec{L}\cdot\vec{N}/(|\vec{L}||\vec{N}|)\} \quad (5)$$

$$\beta=\cos^{-1}\{\vec{V}\cdot\vec{N}/(|\vec{V}||\vec{N}|)\} \quad (6)$$

When the mirror reflection components are taken into consideration, the parameters $K_d$, $K_s$, and m' and the reflection center axis direction vector $\vec{H}$ are used as the training image generation parameters.

A training image can be generated by calculating the estimated luminance value I corresponding to the object surface normal from equation (3) or (4) using the above-described training image generation parameters. That is, in step S1015, K patterns of these training image generation parameters are prepared. After that, N patterns are set as training image process parameter candidates in step S1030, as in the first embodiment.

In training image estimation loop L1030, training image generation by CG is repeated using each training image generation parameter from the model of the target object 400 in training image setting step S1020, as in the first embodiment. Note that when the light source direction is known by a design value or a calibration value, the light source direction vector $\vec{L}$ is uniquely determined, as a matter of course.

After the training image is generated in training image setting step S1020, an appropriate training image process parameter is set using the training image in training/input image process parameter estimation loop L1010, as in the first embodiment. When an appropriate training image process parameter by the kth (1≤k≤K) training image generation parameter is set, the training image by the next training image generation parameter is generated in training image setting step S1020, and the training image process parameter is selected again.

In training image estimation loop L1030, when the training image process parameters corresponding to the first to Kth training image generation parameters are selected, loop L1030 ends, and the process advances to training image process parameter and dictionary determination step S1070. In step S1070, the training image by the training image generation parameter having the minimum estimation error is determined as an appropriate training image, and the training image generation parameter at that time is set as an appropriate training image process parameter, as in the first embodiment.

As described above, in training image estimation loop L1030, generating a training image in training image setting step S1020, generating a dictionary candidate by learning in learning step S1040, and performing estimation using the test image in first estimation step S1060 are repeated. This makes it possible to determine the training image generation parameter including the luminance distribution used to generate the training image.

According to the second embodiment, it is possible to optimize the training image generation parameter representing the surface luminance distribution of the target object 400 and generate a training image.

[Estimation of Luminance Distribution Parameter Using Distance Information]

An example will be described next, in which when the optical characteristic (luminance distribution) of the surface of the target object 400 is unknown, the luminance distribution parameter is estimated as a unique value using distance information obtained from the camera 300 that captures the target object 400. That is, a luminance distribution estimation process to be described below is added to training image setting step S1020 in FIG. 5A.

Assume that distance information is obtained in the test image captured by the camera 300 in advance, and the camera coordinate system position of the surface of the target object 400 at an arbitrary pixel j is observed as $(X_j, Y_j, Z_j)$. At this time, camera coordinate system positions for nine pixels including the pixel j and several points in the neighborhood (for example, eight adjacent pixels) are totaled, and plane approximation is performed, thereby calculating a normal vector $N_j$ of the pixel j. When the normal vectors $N_j$ are calculated for all pixels in the existence region (for example, in a tray 500) of the target object 400 in the test image, the distribution of observation values concerning the correspondence between the luminance value and the normal direction of the surface of the target object 400 can be obtained.

Assuming that there is a single light source, the normal vector $N_j$ of the pixel having the maximum luminance value out of the obtained observation values is estimated as the light source direction vector $\vec{L}=(\vec{L_x}, \vec{L_y}, \vec{L_z})$. At this time, luminance values averaging using the neighboring pixels or the like may be performed in consideration of the observation error or saturation of the luminance, as a matter of course. Additionally, when the light source direction is known, the light source direction need not be estimated.

Figure 8:
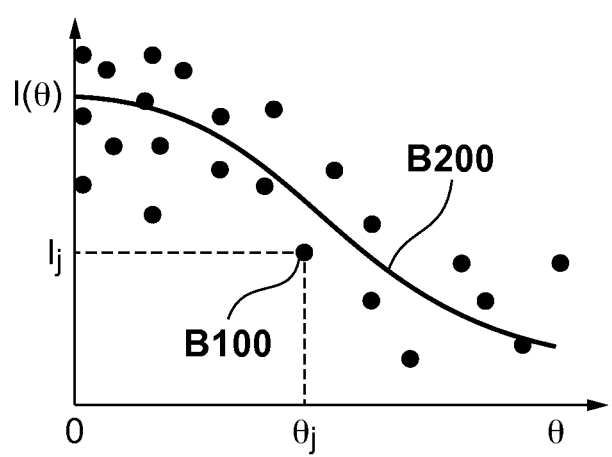
FIG. 8 is a graph showing an observation example of the luminance distribution of the surface of a target object.

When the surface luminance distribution is approximated using a Gaussian function as indicated by equation (3), first, the direction vector $\vec{H}$ of the reflection center axis is calculated by equation (1) with respect to the light source direction vector $\vec{L}$ obtained in the above-described way. Hence, an angle $\theta_j$ of each pixel j from the reflection center axis is obtained from equation (2), and an observation value distribution as shown in FIG. 8 can be obtained. Referring to FIG. 8, a data point B100 is an observation point of the angle $\theta_j$ and a luminance value $I_j$. When maximum likelihood fitting of the model represented by equation (3) is performed on this distribution to obtain B200, the estimated model of the surface luminance distribution of the target object 400 can be obtained. When mirror reflection components are taken into consideration, the luminance distribution may be estimated using equation (4). Angles $\alpha_j$ and $\beta_j$ of equation (4) corresponding to each observation pixel j can be obtained from equations (5) and (6). The observation distribution of the luminance values $I_j$ corresponding to $\theta_j$, $\alpha_j$, and $\beta_j$ can thus be obtained. When maximum likelihood fitting of the model represented by equation (4) is performed on this observation distribution, the estimated model of the surface luminance distribution of the target object 400 can be obtained.

If there exist a plurality of light sources, or disturbance light due to ambient light or the like exists, the luminance distribution may be approximated by a nonparametric regression model $I(\vec{N})$ that receives the normal vector $\vec{N}$ and outputs the luminance value I. A predetermined nonparametric model is learned using the luminance value $I_j$ as a teaching value for the normal vector $\vec{N_j}$ concerning each pixel j of the observation values, thereby obtaining a luminance distribution estimation function. As the nonparametric regression model, various methods such as SVM, Support Vector Regression (SVR), and neural network are usable. When these nonparametric models are used, the light source direction need not be estimated in advance before fitting.

As described above, the training image can be generated in accordance with the model estimated from the test image using the distance information obtained from the camera 300 that captures the target object 400. Alternatively, a plurality of training image generation parameters may be prepared with respect to an estimated training image generation parameter value, and an optimum training image generation parameter may be set by the method described in the second embodiment.

[Training Image Generation by Photographed Image]

In the above-described first and second embodiments, an example has been explained in which the training image is generated by CG. However, the training image is not limited to a CG image. An example will be described below in which the target object 400 is captured in various orientations, thereby obtaining a training image by photographing. That is, in training image setting step S1020 of FIG. 5A, a photographed image is used as a training image instead of generating a training image by CG.

In the present invention, since each of the training image process parameter and the input image process parameter is optimized, the image capturing condition of the training image and that of the test image need not always be the same. For example, a case in which the illumination condition changes, a case in which the image capturing apparatus changes, or a case in which various settings such as the f-number and shutter speed of the image capturing apparatus change are considerable. Each image process parameter is optimized so as to absorb these differences.

Figure 9B:
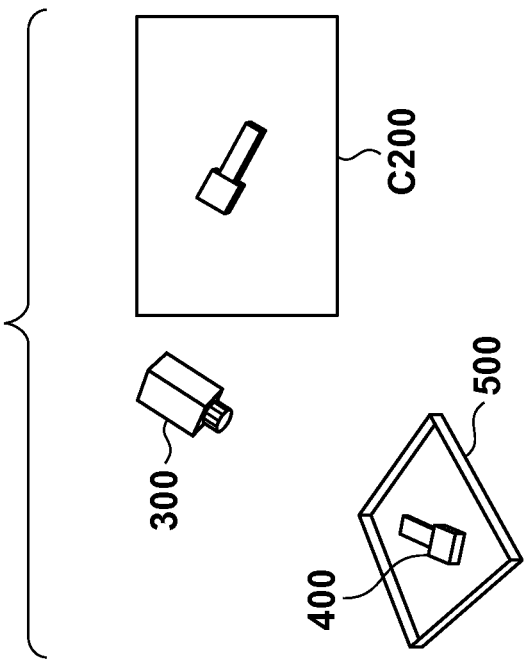
FIGS. 9A and 9B are views for explaining the difference in the appearance of a target object caused by the difference in the camera installation state.
Figure 9A:
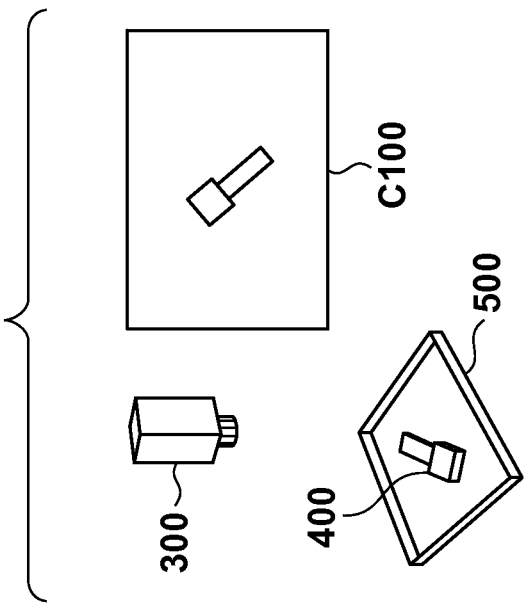

In addition, when the camera angle at the time of training image capturing is different from that at the test image capturing, the appearance of the target object 400 changes. For example, FIG. 9A shows a state at the time of training image capturing, and FIG. 9B shows a state at the time of test image capturing. According to FIGS. 9A and 9B, the appearance of the target object 400 changes as indicated by C100 and C200 depending on the perspective. In this case, affine transformation of the image is included in one or both of the training image process parameter and the input image process parameter. Even when the difference in the camera angle between training image capturing and test image capturing is unknown, it is optimized as the difference between the training image process parameter and the input image process parameter. Especially, if the target object 400 is thick and has a predetermined stable orientation, the above-described method is effective when a part placed flat as in FIGS. 9A and 9B is captured, and the orientation class is limited to in-plane rotation.

As described above, a training image can be generated from a photographed image obtained by capturing the target object 400 in various orientations.

Third Embodiment

The third embodiment of the present invention will be described below. In the above-described embodiments, an example has been explained in which the range of parameters to be optimized is set in advance, and all parameters in the range are estimated. However, if the search parameter range is wide, calculation of the image process parameters takes an enormous time. In the third embodiment, an example will be described in which each image process parameter is corrected in a direction in which an error represented by an estimation result becomes small, thereby searching for the quasi optimum value of the image process parameter.

Figure 5C:
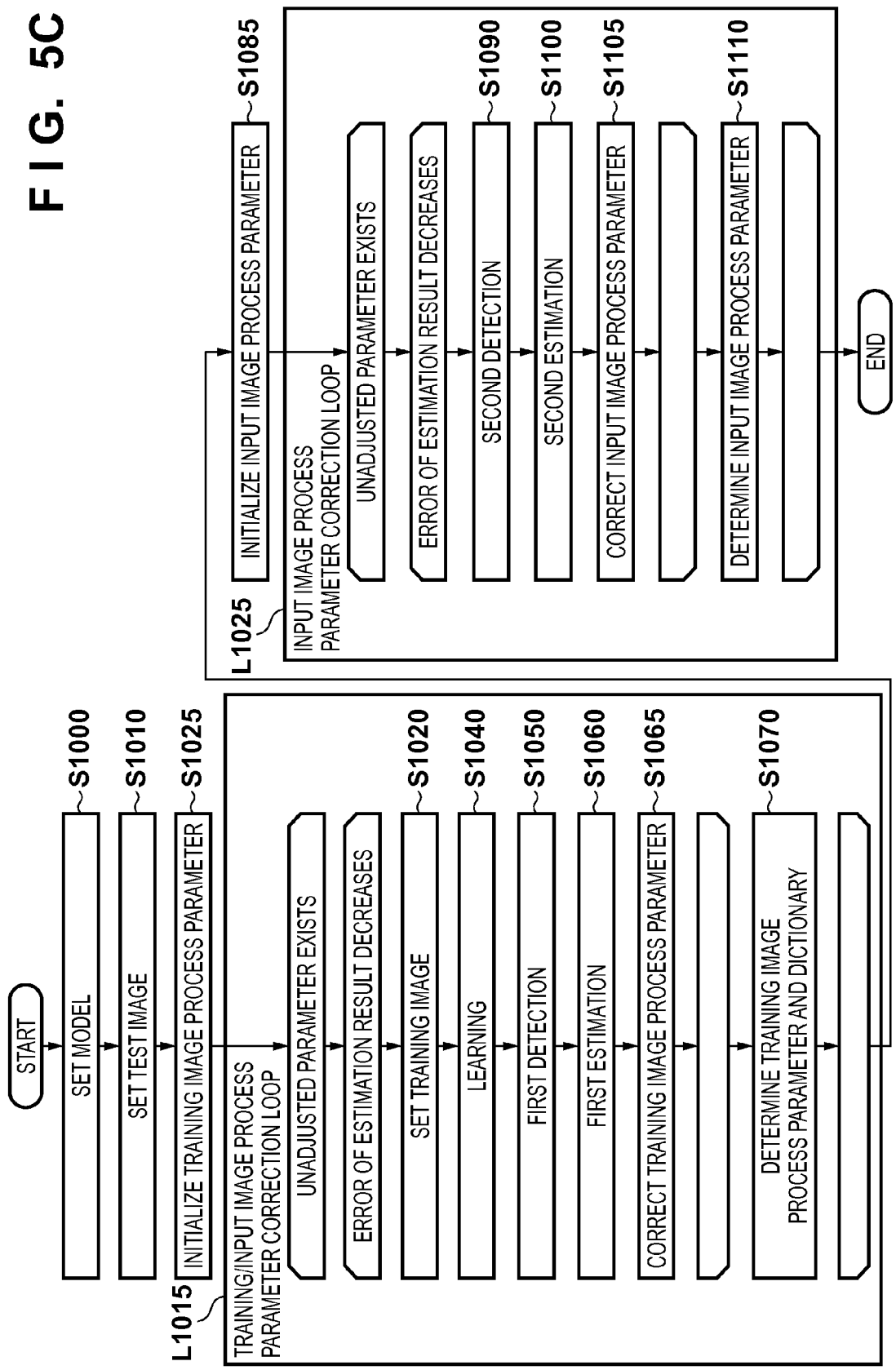

A parameter setting process according to the third embodiment will be described with reference to the flowchart of FIG. 5C. Note that the same step numbers as in the flowchart of FIG. 5A denote the same processes in FIG. 5C, and a description thereof will be omitted.

First, in model setting step S1000, the model of the target object 400 is set, as in the first embodiment. In test image setting step S1010, a test image is acquired by capturing the target object 400. After that, training image process parameter initialization step S1025 is executed to initialize the training image process parameter to an arbitrary value. In training/input image process parameter correction loop L1015, the following optimization is performed for each adjustment target parameter.

[Optimization of Training Image Process Parameter]

In the first loop, a first parameter and a second parameter obtained by adding a predetermined difference to the first parameter to slightly correct it are prepared for an adjustment target parameter. Using the first parameter (initial value) and the second parameter, a training image is set in training image setting step S1020, and learning is performed in learning step S1040. For example, when the adjustment target parameter is the variance σ of a Gaussian filter, and its initial value (first parameter) is $\sigma_0=3.0$, a predetermined difference 0.1 is added to set $\sigma_1=3.1$ as the second parameter. Dictionary candidates for the respective cases are generated.

In first detection step S1050 and first estimation step S1060, each of the two dictionaries is estimated. A parameter having a smaller error obtained as an estimation result is selected. The error at that time is defined as a reference error. A value obtained by subtracting the parameter having a larger error from the parameter having a smaller error is defined as a slightly corrected value. For example, as for the variance σ of the Gaussian filter, if "error for $\sigma_0$>error for $\sigma_1$", the slightly corrected value is $\Delta\sigma=\sigma_1-\sigma_0=3.1-3.0=0.1$. This calculation is done in training image process parameter correction step S1065. In step S1065, the slightly corrected value is added to the first parameter (initial value if in the first loop) at the current point of time, thereby updating the first parameter.

From the second loop, learning step S1040, first detection step S1050, and first estimation step S1060 are performed in accordance with the first parameter set in training image process parameter correction step S1065, thereby obtaining an estimation result. If the error obtained as the estimation result is larger than the reference error by the first parameter in the immediately preceding loop, the loop ends for the current adjustment target parameter.

In training image process parameter and dictionary determination step S1070, the first parameter in the immediately preceding loop, that is, the first parameter that minimizes the reference error is determined as the optimum value, and the adjustment target parameter is changed. When optimum value determination in step S1070 ends for all adjustment target parameters, training/input image process parameter correction loop L1015 ends. When training/input image process parameter correction loop L1015 ends, the optimization of the training image process parameter and the dictionary ends.

The input image process parameter is optimized next. First, in input image process parameter initialization step S1085, the input image process parameter is initialized to an arbitrary value. In input image process parameter correction loop L1025, the following optimization is performed for each input image process parameter to be adjusted.

[Optimization of Input Image Process Parameter]

In the first loop, concerning an adjustment target parameter, using a first parameter (initial value) and a second parameter obtained by adding a predetermined difference to the initial value to slightly correct it, detection and estimation of the target object 400 are performed in second detection step S1090 and second estimation step S1100. A parameter having a smaller error obtained as an estimation result is selected. The error at that time is defined as a reference error. A value obtained by subtracting the parameter having a larger error from the parameter having a smaller error is defined as a slightly corrected value. This calculation is done in input image process parameter correction step S1105. In step S1105, the slightly corrected value is added to the first parameter (initial value if in the first loop) at the current point of time, thereby updating the first parameter.

From the second loop, second detection step S1090 and second estimation step S1100 are performed in accordance with the first parameter set in input image process parameter correction step S1105, thereby obtaining an estimation result. If the error obtained as the estimation result is larger than the reference error by the first parameter in the immediately preceding loop, the loop ends for the current adjustment target parameter.

In input image process parameter determination step S1110, the first parameter in the immediately preceding loop, that is, the first parameter that minimizes the reference error is determined as the optimum value, and the adjustment target parameter is changed. When optimum value determination in input image process parameter determination step S1110 ends for all adjustment target parameters, input image process parameter correction loop L1025 ends. That is, when input image process parameter correction loop L1025 ends, the optimization of the input image process parameter ends.

As described above, according to the third embodiment, each of the training image process parameter and the input image process parameter is repetitively corrected in the direction in which the error becomes small, thereby determining a quasi optimum parameter as a minimum solution and shortening the calculation time of the training image process parameter and the input image process parameter.

Modifications of Embodiments

A parameter setting process according to the present invention is not limited to the process described in the above embodiments, and has a high degree of freedom in setting the training image process parameter and the input image process parameter. Modifications of the parameter setting process will be described below with reference to the flowcharts of FIGS. 10A to 10C. Note that the same step numbers as in the flowcharts of FIGS. 5A to 5C denote the same processes in FIGS. 10A to 10C, and a description thereof will be omitted.

[First Modification of Parameter Setting Process]

FIG. 10A is a flowchart showing a process of setting the input image process parameter together with the training image process parameter and then adjusting the training image process parameter to a different value.

First, in step S1080, N patterns are set as input image process parameter candidates. In training/input image process parameter estimation loop L1010, dictionaries are learned by setting the training image process parameter and the input image process parameter to the same value, a detection process is performed for the test image, and the detection result is estimated as in the first embodiment. Hence, the process of setting the input image process parameter candidates in step S1080 is synonymous with the process of setting the training image process parameter candidates.

In input image process parameter determination step S1110, the training image process parameter having the best estimation result in training/input image process parameter estimation loop L1010 is set as an appropriate input image process parameter.

After M patterns are set as training image process parameter candidates in step S1030, the parameter candidates are estimated in training image process parameter estimation loop L1040. That is, as in training/input image process parameter estimation loop L1010, dictionaries are learned using various training image process parameter candidates, a detection process is performed for the test image, and the detection result is estimated. At this time, the input image process parameter is fixed to the value determined in input image process parameter determination step S1110. In training image process parameter and dictionary determination step S1070, the training image process parameter having the best estimation result in training image process parameter estimation loop L1040 is determined as an appropriate training image process parameter, and the dictionary at that time is determined as the optimum dictionary.

[Second Modification of Parameter Setting Process]

FIG. 10B is a flowchart showing a process of setting the training image process parameter while fixing the input image process parameter.

In this case, the input image process parameter is set as a fixed value in input image process parameter determination step S1110. In training image process parameter estimation loop L1040, dictionaries are learned by variously changing only the training image process parameter while fixing the input image process parameter, a detection process is performed for the test image, and the detection result is estimated, as in loop L1040 of FIG. 10A. In training image process parameter and dictionary determination step S1070, the training image process parameter having the best estimation result in training image process parameter estimation loop L1040 is determined as an appropriate training image process parameter, and the dictionary at that time is determined as the optimum dictionary.

[Third Modification of Parameter Setting Process]

Figure 10C:
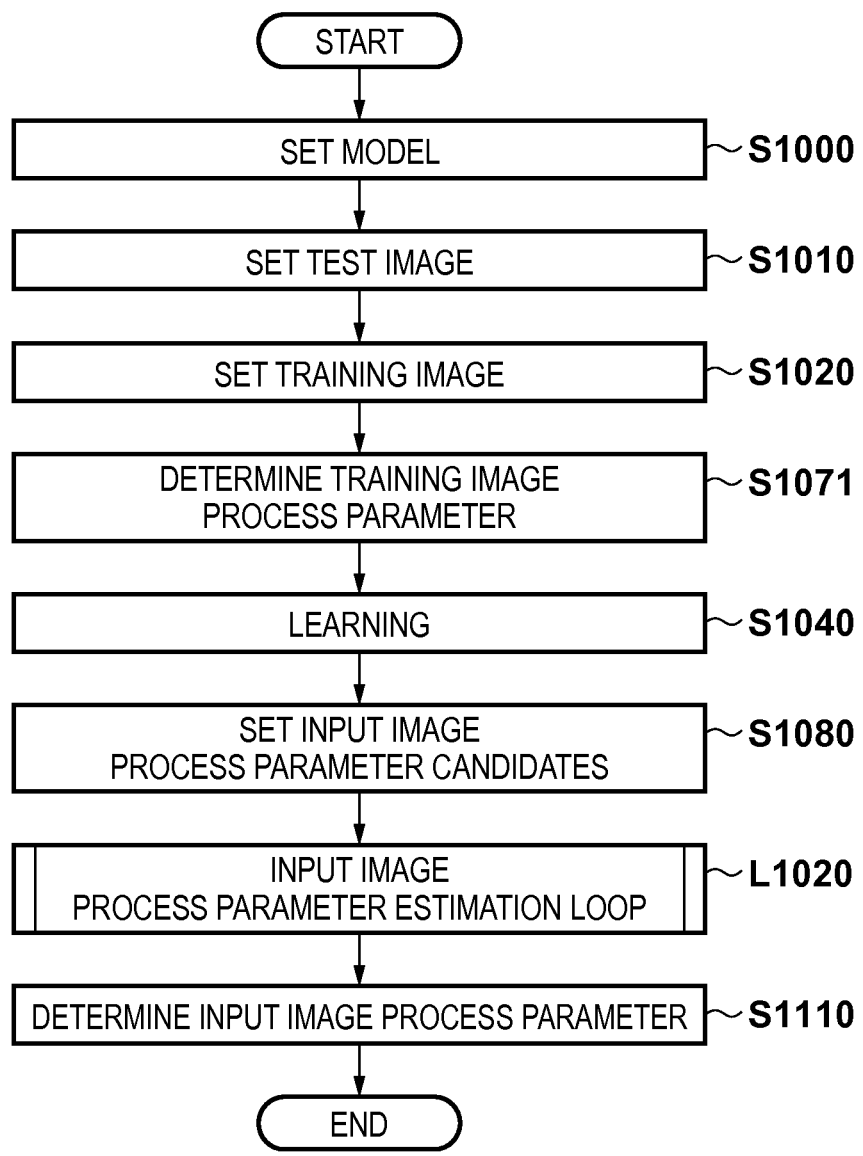

FIG. 10C is a flowchart showing a process of setting the input image process parameter while fixing the training image process parameter.

In this case, the training image process parameter is set as a fixed value in training image process parameter determination step S1071. In learning step S1040, a learning process is performed using the set training image process parameter, and dictionary candidates are created.

In input image process parameter estimation loop L1020, a detection process is performed for the test image by changing only the input image process parameter while fixing the training image process parameter and the dictionary, and the detection result is estimated, as in the first embodiment. In input image process parameter determination step S1110, the input image process parameter having the best estimation result in input image process parameter estimation loop L1020 is determined as an appropriate input image process parameter.

As described above, the methods shown in FIGS. 10A to 10C can also appropriately set the training image process parameter and the input image process parameter.

Note that in the above-described embodiments, the input image in run time may be used as the test image. This makes it possible to dynamically apply appropriate image process parameters even when the environment changes in run time.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-006752 filed Jan. 17, 2013 which is hereby incorporated by reference herein in its entirety.

What is claimed is:

1. An image processing apparatus comprising:
one or more non-transitory computer-readable storage devices; and
one or more computer processing devices connected to the one or more non-transitory computer-readable storage devices and configured by one or more programs stored in the one or more non-transitory computer-readable storage devices at least to:
set a plurality of first image process parameter candidates;
generate a plurality of processed training images by processing a training image using one of the plurality of first image process parameter candidates, wherein each of the plurality of processed training images is an image generated by using a different first image process parameter candidate;
generate a plurality of dictionary candidates based on the plurality of processed training images;
generate a plurality of first processed test images by processing a first test image using one of the plurality of first image process parameter candidates, wherein each of the plurality of first processed test images is an image generated by using a different first image process parameter candidate;
detect, in each of the plurality of first processed test images, a target object by using one of the plurality of dictionary candidates;
determine a dictionary based on detection results of detecting the target object in the plurality of first processed test images;
set a plurality of second image process parameter candidates;
generate a plurality of second processed test images by processing a second test image using one of the plurality of second image process parameter candidates, wherein each of the plurality of second processed test images is an image generated by using a different second image process parameter candidate;

detect, in each of the plurality of second processed test images, the target object by using the determined dictionary; and determine a second image process parameter based on detection results of detecting the target object in the plurality of second processed test images; and store the determined dictionary and the determined second image process parameter in at least one of the one or more non-transitory computer-readable storage devices, wherein the training image is different from the first and second test images, and wherein each of the first and second test image is a photographed image.

2. The apparatus according to claim 1, wherein the one or more computer processing devices are further configured by the one or more programs at least to:

set model information of the target object;

calculate a first estimation value associated with a detection error of detecting, in each of the plurality of first processed test images, the target object by using one of the plurality of dictionary candidates, based at least on the model information; and calculate a second estimation value associated with a detection error of detecting, in each of the plurality of second processed test images, the target object by using the determined dictionary, based at least on the model information.

3. The apparatus according to claim 2, wherein the dictionary is determined based at least on the first estimation value.

4. The apparatus according to claim 2, wherein the second image process parameter is determined based at least on the second estimation value.

5. The apparatus according to claim 2, wherein the training image is a computer graphics image generated from the model information and a luminance distribution of a surface of the target object.

6. The apparatus according to claim 2, wherein the photographed image is an image of the target object captured by an image capturing apparatus.

7. The apparatus according to claim 2, wherein the calculation of the first estimation value further includes generating a first computer graphics image from the model information based at least on a detecting of the target object in each of the plurality of first processed test images and a comparison of corresponding portions of an edge extracted from the first computer graphics image and an edge extracted from each of the plurality of first processed test images, and wherein the calculation of the second estimation value further includes generating a second computer graphics image from the model information based at least on a detecting of the target object in each of the plurality of second processed test images and a comparison of corresponding portions of an edge extracted from the second computer graphics image and an edge extracted from each of the plurality of second processed test images.

8. The apparatus according to claim 2, wherein the calculation of the first estimation value further includes determining first distance information of a predetermined position of the target object from the model information and second distance information of the detected target object in each of the plurality of first processed test images, and comparing the first distance information and the second distance information, and wherein the calculation of the second estimation value further includes determining third distance information of the detected target object in each of the plurality of second processed test images, and comparing the first distance information and the third distance information.

9. The apparatus according to claim 5, wherein the one or more computer processing devices are further configured by the one or more programs at least to set one or more generation parameters of the training image, and wherein the computer graphics image is generated according to the one or more generation parameters.

10. The apparatus according to claim 9, wherein each generation parameter of the one or more generation parameters represents a luminance distribution of a surface of the target object.

11. The apparatus according to claim 1, wherein the training image and the photographed image are images captured under image capturing conditions different from each other.

12. An apparatus for recognizing an object from an input image, comprising:

one or more first non-transitory computer-readable storage devices; and one or more first computer processing devices connected to the one or more non-transitory computer-readable storage devices and configured by one or more programs stored in the one or more non-transitory computer-readable storage devices at least to:

receive an input image;

recognize a target object from the input image according to a dictionary and a second image process parameter determined by an image processing apparatus; and store a result of the recognition of the target object in at least one of the one or more first non-transitory computer-readable storage devices, wherein the image processing apparatus comprises:

one or more second non-transitory computer-readable storage devices; and one or more second computer processing devices connected to the one or more non-transitory computer-readable storage devices and configured by one or more programs stored in the one or more non-transitory computer-readable storage devices at least to:

set a plurality of first image process parameter candidates;

generate a plurality of processed training images by processing a training image using one of the plurality of first image process parameter candidates, wherein each of the plurality of processed training images is an image generated by using a different first image process parameter candidate;

generate a plurality of dictionary candidates based on the plurality of processed training images;

generate a plurality of first processed test images by processing a first test image using one of the plurality of first image process parameter candidates, wherein each of the plurality of first processed test images is an image generated by using a different first image process parameter candidate;

detect, in each of the plurality of first processed test images, a target object by using one of the plurality of dictionary candidates;

determine the dictionary based on detection results of detecting the target object in the plurality of first processed test images;

set a plurality of second image process parameter candidates;

generate a plurality of second processed test images by processing a second test image using one of the plurality of second image process parameter candidates, wherein each of the plurality of second processed test images is an image generated by using a different second image process parameter candidate;

detect, in each of the plurality of second processed test images, the target object by using the determined dictionary;

determine the second image process parameter based on detection results of detecting the target object in the plurality of second processed test images; and store the determined dictionary and the determined second image process parameter in at least one of the one or more non-transitory computer-readable storage devices, wherein the training image is different from the first and second test images, and wherein each of the first and second test image is a photographed image.

13. An image processing method of setting image process parameters defining, at least in part, an image recognition process of detecting a target object from an input image, the method comprising:

causing at least a processor to perform at least the steps of:

setting a plurality of first image process parameter candidates;

generating a plurality of processed training images by processing a training image using one of the plurality of first image process parameter candidates, wherein each of the plurality of processed training images is an image generated by using a different first image process parameter candidate;

generating a plurality of dictionary candidates based on the plurality of processed training images;

generating a plurality of first processed test images by processing a first test image using one of the plurality of first image process parameter candidates, wherein each of the plurality of first processed test images is an image generated by using a different first image process parameter candidate;

detecting, in each of the plurality of first processed test images, a target object by using one of the plurality of dictionary candidates;

determining a dictionary based on detection results of detecting the target object in the plurality of first processed test images;

setting a plurality of second image process parameter candidates;

generating a plurality of second processed test images by processing a second test image using one of the plurality of second image process parameter candidates, wherein each of the plurality of second processed test images is an image generated by using a different second image process parameter candidate;

detecting, in each of the plurality of second processed test images, the target object by using the determined dictionary;

determining a second image process parameter based on detection results of detecting the target object in the plurality of second processed test images; and storing the determined dictionary and the determined second image process parameter in at least one of the one or more non-transitory computer-readable storage devices, wherein the training image is different from the first and second test images, and wherein each of the first and second test image is a photographed image.

14. A non-transitory computer readable storage medium storing a computer-executable program for causing a computer to perform an image processing method of setting image process parameters defining, at least in part, an image recognition process of detecting a target object from an input image, the method comprising:

setting a plurality of first image process parameter candidates;

generating a plurality of processed training images by processing a training image using one of the plurality of first image process parameter candidates, wherein each of the plurality of processed training images is an image generated by using a different first image process parameter candidate;

generating a plurality of dictionary candidates based on the plurality of processed training images;

detecting, in each of the plurality of first processed test images, a target object by using one of the plurality of dictionary candidates;

determining a dictionary based on detection results of detecting the target object in the plurality of first processed test images;

setting a plurality of second image process parameter candidates;

generating a plurality of second processed test images by processing a second test image using one of the plurality of second image process parameter candidates, wherein each of the plurality of second processed test images is an image generated by using a different second image process parameter candidate;

detecting, in each of the plurality of second processed test images, the target object by using the determined dictionary;

determining a second image process parameter based on detection results of detecting the target object in the plurality of second processed test images; and storing the determined dictionary and the determined second image process parameter in at least one of the one or more non-transitory computer-readable storage devices, wherein the training image is different from the first and second test images, and wherein each of the first and second test image is a photographed image.

15. The apparatus according to claim 1, wherein each of a first process performed by using one of the first image process parameter candidates and a second process performed by using the second image process parameter or one of the second image process parameter candidates includes at least one of a noise removal process, an edge detection process or a feature detection process.

16. An image processing apparatus comprising:

one or more non-transitory computer-readable storage devices; and one or more computer processing devices connected to the one or more non-transitory computer-readable storage devices and configured by one or more programs stored in the one or more non-transitory computer-readable storage devices at least to:

read a plurality of dictionary candidates from the one or more non-transitory computer-readable storage devices;

generate a plurality of first processed test images by processing a first test image using one of a plurality of first image process parameter candidates, wherein each of the plurality of first processed test images is an image generated by using a different first image process parameter candidate;

detect, in each of the plurality of first processed test images, a target object by using one of the plurality of dictionary candidates;

determine a dictionary based on detection results of detecting the target object in the plurality of first processed test images;

set a plurality of second image process parameter candidates;

generate a plurality of second processed test images by processing a second test image using one of the plurality of second image process parameter candidates, wherein each of the plurality of second processed test images is an image generated by using a different second image process parameter candidate;

detect, in each of the plurality of second processed test images, the target object by using the determined dictionary;

determine a second image process parameter based on detection results of detecting the target object in the plurality of second processed test images; and store the determined dictionary and the determined second image process parameter in at least one of the one or more non-transitory computer-readable storage devices, wherein each of the first and second test image is a photographed image.

17. The apparatus according to claim 1, wherein the plurality of first image process parameter candidates and the plurality of second image process parameter candidates are parameters for a same type of image processing.

18. The apparatus according to claim 1, wherein the plurality of first processed test images and the plurality of second processed test images are generated by processing a same test image.

* * * * *